US009967922B2

(12) United States Patent
Day

(10) Patent No.: US 9,967,922 B2
(45) Date of Patent: May 8, 2018

(54) GLAZING

(71) Applicant: PILKINGTON GROUP LIMITED, Lancashire (GB)

(72) Inventor: Stephen Roland Day, Manchester (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 71 days.

(21) Appl. No.: 15/123,458

(22) PCT Filed: Mar. 6, 2015

(86) PCT No.: PCT/GB2015/050666
§ 371 (c)(1),
(2) Date: Sep. 2, 2016

(87) PCT Pub. No.: WO2015/132611
PCT Pub. Date: Sep. 11, 2015

(65) Prior Publication Data

US 2017/0079091 A1 Mar. 16, 2017

(30) Foreign Application Priority Data

Mar. 7, 2014 (GB) .................................. 1404084.4

(51) Int. Cl.
*B60L 1/02* (2006.01)
*H05B 3/84* (2006.01)

(52) U.S. Cl.
CPC ......... *H05B 3/84* (2013.01); *H05B 2203/002* (2013.01); *H05B 2203/011* (2013.01); *H05B 2203/014* (2013.01); *H05B 2203/031* (2013.01)

(58) Field of Classification Search
CPC ... H05B 3/84; H05B 3/10; H05B 3/26; H05B 3/36; H05B 2203/002; H05B 2203/011;
(Continued)

(56) References Cited

U.S. PATENT DOCUMENTS

| | | | |
|---|---|---|---|
| 6,011,244 | A | 1/2000 | Castle et al. |
| 2007/0187383 | A1 | 8/2007 | Wipfler et al. |
| 2010/0200286 | A1 | 8/2010 | Melcher et al. |

FOREIGN PATENT DOCUMENTS

| | | | |
|---|---|---|---|
| EP | 0 112 930 | A1 | 7/1984 |
| EP | 0 788 294 | A2 | 8/1997 |

(Continued)

OTHER PUBLICATIONS

International Search Report (PCT/ISA/210) dated May 18, 2015, by the European Patent Office as the International Searching Authority for International Application No. PCT/GB2015/050666.

(Continued)

*Primary Examiner* — Shawntina Fuqua
(74) *Attorney, Agent, or Firm* — Buchanan Ingersoll & Rooney PC

(57) ABSTRACT

A glazing comprising a transparent substrate, a plurality of electrically conductive filaments extending over the transparent substrate, wherein the filaments are shaped into a sequence of portions of the perimeters of ellipses, wherein ellipse axial ratios of the ellipses are in the range 1.1 to 4.0 and are selected so that from a pre-defined viewing position and in corresponding pre-defined viewing directions the ellipses in the plane of substrate are viewed as circles. In a preferred embodiment, major axis angles are selected so that from a pre-defined viewing position and in corresponding pre-defined viewing directions the ellipses in the plane of substrate are viewed as circles. In an example of a heated vehicle window, diffraction patterns caused by oncoming headlights interacting with heating filaments of a vehicle window are thereby minimized.

18 Claims, 6 Drawing Sheets

(58) Field of Classification Search
CPC ........ H05B 2203/014; H05B 2203/031; H05B 2203/004; H05B 2203/017; H05B 2203/037; C03C 17/04
See application file for complete search history.

(56) References Cited

FOREIGN PATENT DOCUMENTS

| | | | |
|---|---|---|---|
| EP | 2 275 389 | A2 | 1/2011 |
| EP | 2 278 850 | A1 | 1/2011 |
| EP | 2 284 134 | A1 | 2/2011 |
| EP | 2 286 992 | A2 | 2/2011 |
| EP | 2 381 739 | A2 | 10/2011 |
| EP | 2 555 584 | A2 | 2/2013 |

OTHER PUBLICATIONS

Written Opinion (PCT/ISA/237) dated May 18, 2015, by the European Patent Office as the International Searching Authority for International Application No. PCT/GB2015/050666.

GLAZING

BACKGROUND OF THE INVENTION

The invention is concerned with a glazing comprising filaments, for example an automotive glazing comprising heating filaments.

It is well known that parallel straight heater wires integrated into a glazing and viewed in transmission against a bright light source can produce obtrusive light diffraction patterns, particularly obvious in night time viewing conditions. Such diffraction patterns, also known as 'starburst', 'sparkle' or 'star filter' effect, comprise rays emanating from a point light source.

US20070187383 (Southwall) discloses that if a driver's eyes are focused into the far distance and heating wires stretched between the top and bottom of a windshield, then a 'star filter' pattern will be observed to the sides of any light source, causing distraction. A wire shape is disclosed, formed of a succession of quarter arcs, wherein no portion is linear.

US20100200286 (Saint Gobain) discloses a conductive grid structure for minimising the optical impact of diffraction patterns. The structure is applied by a deposition and removal process, preferably optical lithography.

EP2284134, EP2381739 and EP2555584 (L G Chem) disclose many interconnecting conductive lines between nodes aimed at minimizing diffraction and interference of light. Irregular patterns of many interconnecting lines are disclosed which provide uniform heating per unit area. A disadvantage of many interconnecting lines for heating is that not all conductive lines carry equal current. Vision may be unnecessarily blocked by conductive lines which are electrically redundant.

EP2286992 and EP2278850 (Fujifilm) disclose wires formed into wavy lines and arranged in a mesh. A number of periods of the waves occur between intersections with the aim to reduce deterioration of a displayed image due to interference of diffracted light.

There remains a need for an alternative glazing comprising filaments for heating, which further minimises a starburst effect.

STATEMENT OF INVENTION

According to the present invention, a glazing is provided comprising the features set out in claim 1 attached hereto.

The present invention offers a glazing having reduced starburst effect, i.e. optical effects due to diffraction, by providing filaments formed into sequences of portions of the perimeters of ellipses having particular ellipse aspect ratios.

This invention is aimed at automotive windscreens, and in particular those installed at an angle, commonly referred to as a rake angle. Rake angle is selected to make a vehicle more aerodynamic or for styling. In the prior art, semicircles formed from wire in the plane of the glass have the effect of diffracting light into many angles equally from the direction of view of the observer only if the glass is viewed in a perpendicular orientation. According to the present invention, because the typical windscreen is viewed at an angle to its surface, particular ellipse aspect ratios have superior properties.

It is known that displays comprising two grid structures superposed can suffer from the formation of Moiré patterns. Many ways have been found to bend, kink and align wires to reduce the Moiré problems but they should not be confused with the objectives in this invention.

Semi-ellipses formed in the plane of the glass can be arranged to appear as semicircles from the direction of view of the driver. Semi-ellipses, like semicircles, have no locations where the wire curvature is zero and have portions of wire that are at every angle from the point of view of the driver. Axial ratio is defined for ellipses as the ratio of the longer and shorter diameters. Axial ratio describes the shape of the ellipse but not its size.

An X-shaped starburst night time diffraction effect, which occurs in many wire heated windscreens, can be eliminated by forming wires into sequences of semi-ellipses rather than conventional sine wave shapes.

Although forming wire into semi-ellipses is harder than forming into sine waves, it is easier and more reliable than generating total randomness. If heater wires are not manufactured from a spool of wire, but created by printing, or etching processes then almost arbitrary conductor patterns can be fabricated.

Computer programs can generate intricate patterns often involving thousands of wires with good optical properties. A semi-ellipse is a good basic element to use in heater patterns from the point of view of good diffraction performance and implementation into algorithms.

Preferably smaller fragments of ellipses are used, to reduce diffraction when the driver is focused on the wires rather than the road ahead.

Preferably adjacent heater wires cross and branch. Fragments of ellipses can be used to advantage to implement these crosses and branches.

More than one type of diffraction pattern is seen by a vehicle driver using a wire heated windscreen. Two types of diffraction pattern are observable by a driver in a vehicle when focussing (A) on the wires and (B) into the far distance. There is an evolution between these patterns if the driver's focus is moved between these extremes. If both types of pattern are reduced, then all distraction effects are reduced, regardless where the driver focuses.

In the prior art, wires formed as sine waves have the property that at the point they cross the central axis there is no curvature in the wire. As the wire is relatively straight at these locations the straight sections may sparkle particularly brightly if the eye is focused on them, as well as generating a starburst effect when the eye is focused into the far distance. Distraction effects on a driver of a vehicle are at a lower severity than, but essentially similar to, effects occurring if wires are not crimped. Relatively straight sections of wire occur in two directions as the sine wave profile alternates between the two sides of the central axis. As viewed from the direction of the driver, the wire directions are perpendicular to rays in an X-shaped starburst.

The X-shaped starburst from sine waves is made more obtrusive because four bright 'arms' emanate from a central point and because of the contrast between light scattered to one side of each 'arm' and no light scattered to the other side. In fog, rain or simply observing objects out of focus, the human brain is accustomed to objects being surrounded by scattered and inaccurately focused light and pays relatively little attention to it. The 'X' attracts human attention because the brain's processing of an image is known to involve finding 'lines' and 'edges' of objects and then comparing these with learned objects.

'Wiggles', i.e. non-sinusoidal wave-shaped filaments, have a similar disadvantage to sine waves because each individual deviation from the general vertical wire direction is typically an arc with relatively straight sections of wire as the wire curvature changes from one hand to the other. Wires rarely take a direction perpendicular to the general direction of current flow so there can not be a uniform diffraction of light to all angles around a lamp as seen by a vehicle driver, so the result is a starburst effect.

Perfect semicircular arcs of alternating direction are known in the art, in part because they are aesthetically attractive patterns. Their significance in reducing the starburst effect, over and above sine wave shaping of wires, appears not to have been fully appreciated. Semicircles have been used in heaters, either for aesthetic reasons or ease of drawing on a computer system.

According to the present invention, semi-ellipses are used so that the wire axis is distributed equally into all directions, (as perceived by the driver), and because the magnitude of the wire curvature (as perceived by the driver) is constant with no part of the wire 'straighter' than any other. The curvature of successive semi-ellipses, (seen as semicircles by the driver), alternates in polarity but theoretically is never zero. The effect is based on an understanding, not present in the prior art, that a windscreen is raked and the driver's view is rarely normal to the glass, which modifies the perceived starburst effect.

BRIEF DESCRIPTION OF THE DRAWINGS

The invention will now be described by means of non-limiting examples with reference to the attached figures.

DETAILED DESCRIPTION OF THE INVENTION

Figure 1:
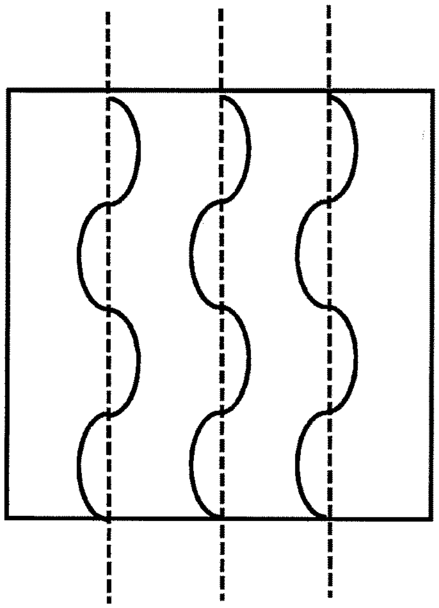
FIG. 1 shows a basic arrangement of semi-ellipses according to the invention

FIG. 1 shows an embodiment of the invention. Filaments are shaped into a sequence of portions of the perimeters of ellipses having ellipse axial ratios greater than unity.

Figure 2A:
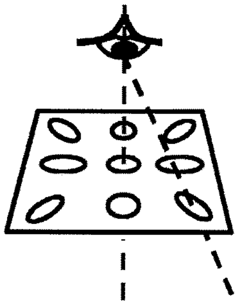
FIG. 2 shows ellipses viewed from a pre-defined viewing position
Figure 2B:
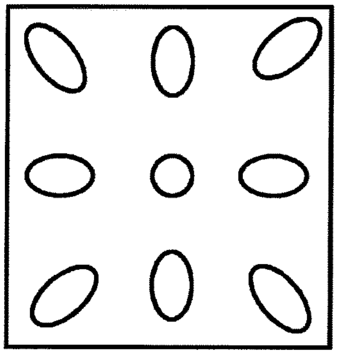

FIG. 2 shows a transparent flat sheet positioned in front of an eye, having circles and ellipses drawn on the sheet. It is possible to choose ellipses with different axial ratios and orientations so that the eye perceives each one of them as a circular shape. Where the eye views along the normal to the sheet, there is a circle which is a special case of an ellipse with axial ratio of unity.

Figure 3A:
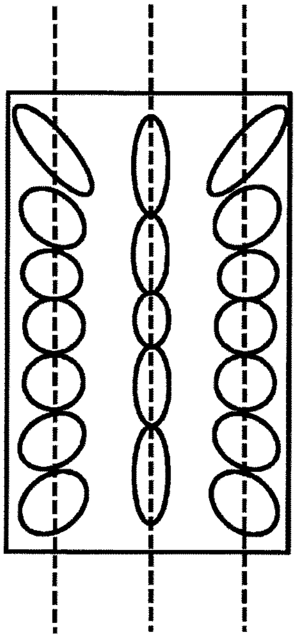
FIG. 3 shows portions of the perimeters of ellipses, adapted for a rake angle
Figure 3B:
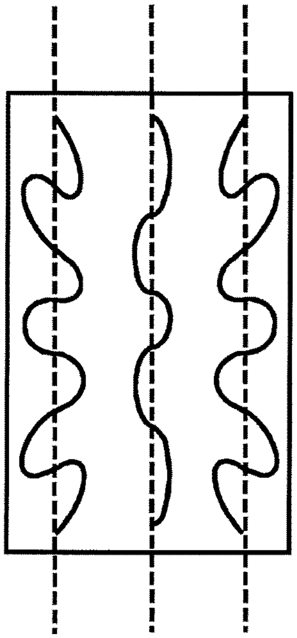

FIG. 3 shows a series of ellipses on a sheet suitable for installation at a rake angle. No ellipse has an axial ratio of unity. Each ellipse will appear as a circle to the eye. Ellipses have been added so that they touch and are centred at points on three central axes. Three wire shapes are created by using half of the outline of each ellipse. It should be understood that in a practical automotive heater these ellipses are much smaller and more densely packed.

Figure 4A:
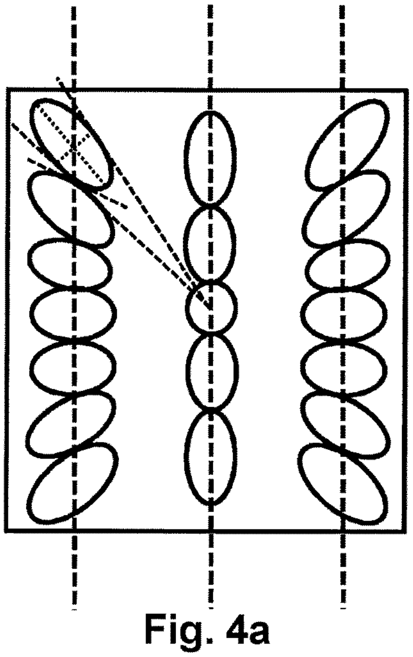
FIG. 4 shows portions of the perimeters of ellipses, not divided on major or minor axis
Figure 4B:
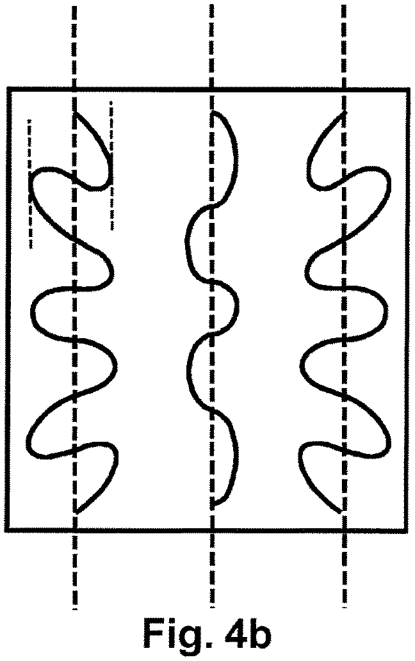

FIG. 4 shows that the semi-ellipses used have half the perimeter length of the complete ellipse. Only in special cases is the semi-ellipse used that would be formed by dividing the ellipse on its major or minor axis. The angle of the tangent to the ellipses at the touching point on the wire axis typically differs from the angles of both the major and minor axis. It also shows, for use later, that each semi-ellipse can be divided into two parts by selecting points on the semi-ellipses with tangents in the wire axis direction. This is not the only way to divide the semi-ellipses but it is a convenient way. The lengths of each portion of semi-ellipse will not be exactly a quarter of the circumference of the ellipse. These parts are described as quarters of the ellipse only because the ellipse circumference has to be divided into four parts.

Figure 5A:
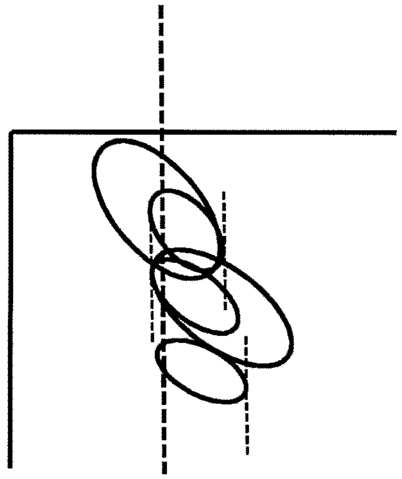
FIG. 5 shows ellipses of different sizes used in combination
Figure 5B:
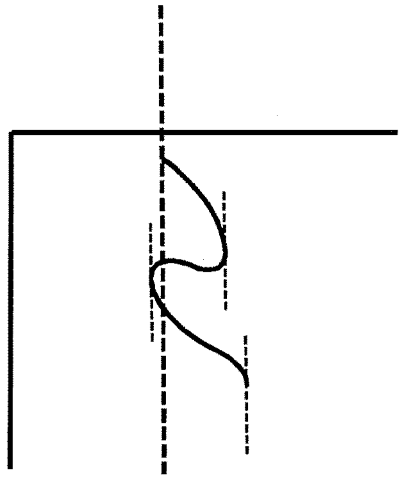

FIG. 5 shows a series of ellipses not centred on a common axis and having variable spacing between centre lines.

Figure 6A:
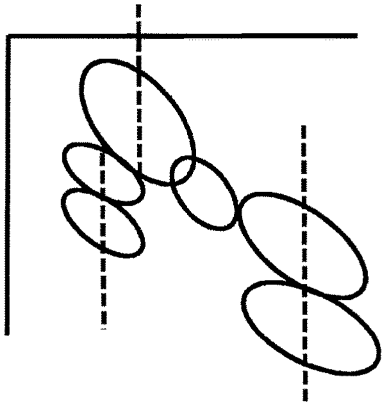
FIG. 6 shows ellipses of different sizes and a branch
Figure 6B:
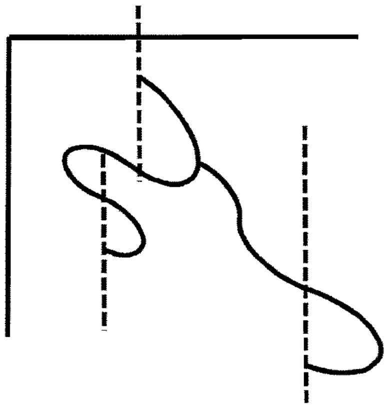

FIG. 6 shows the formation of a branch. Filaments comprising branches can be used to provide heating in non-rectangular areas.

Figure 7A:
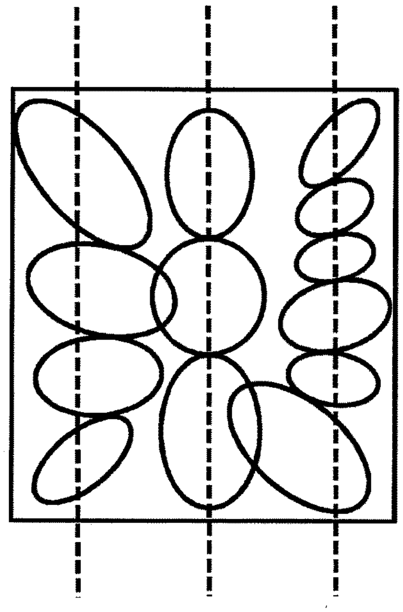
FIG. 7 shows ellipses arranged to form crossing points
Figure 7B:
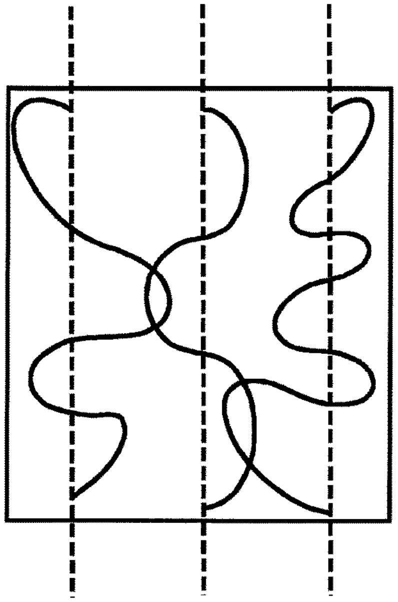

FIG. 7 shows ellipses having crossing points. This embodiment provides an interconnected mesh, which is advantageous because heating may still be provided even if one section of the mesh should break.

Figure 8A:
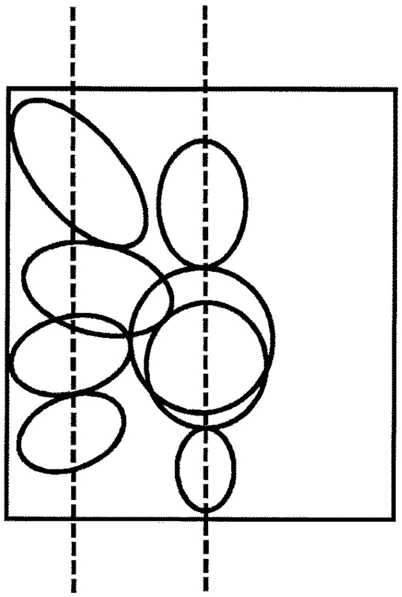
FIG. 8 shows ellipses arranged to form a crossing point
Figure 8B:
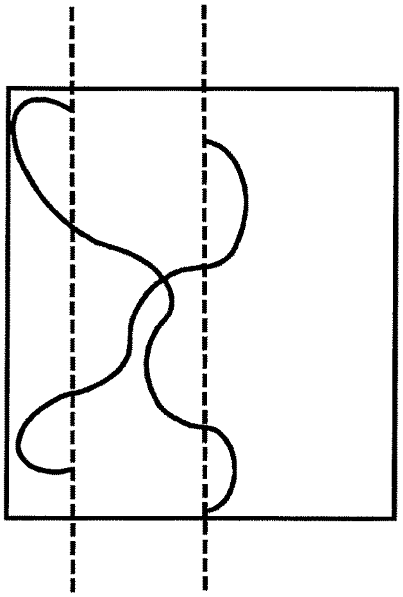

FIG. 8 shows an embodiment of the invention in which ellipses are arranged to allow a filament to extend from one axis to another axis via a single crossing point.

Figure 9A:
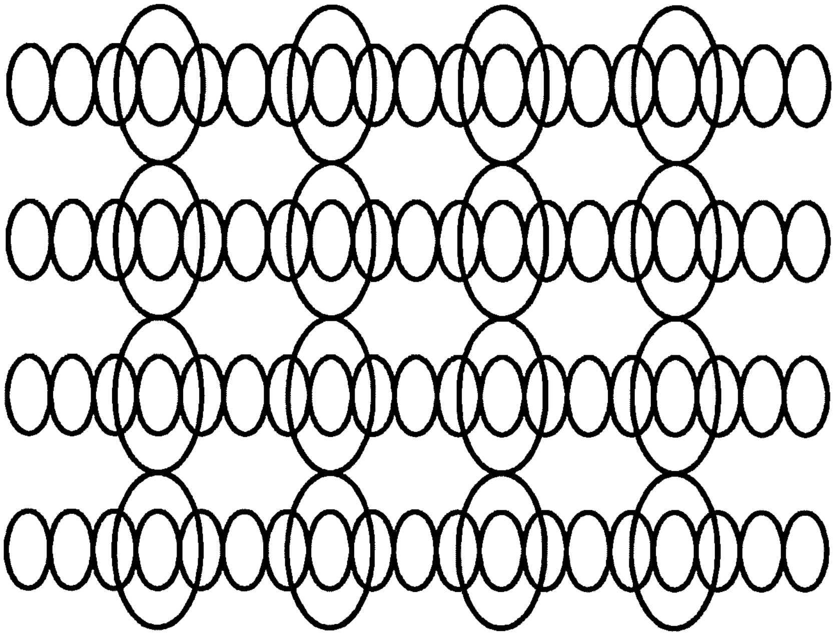
FIG. 9 shows ellipses arranged to form a regular network
Figure 9B:
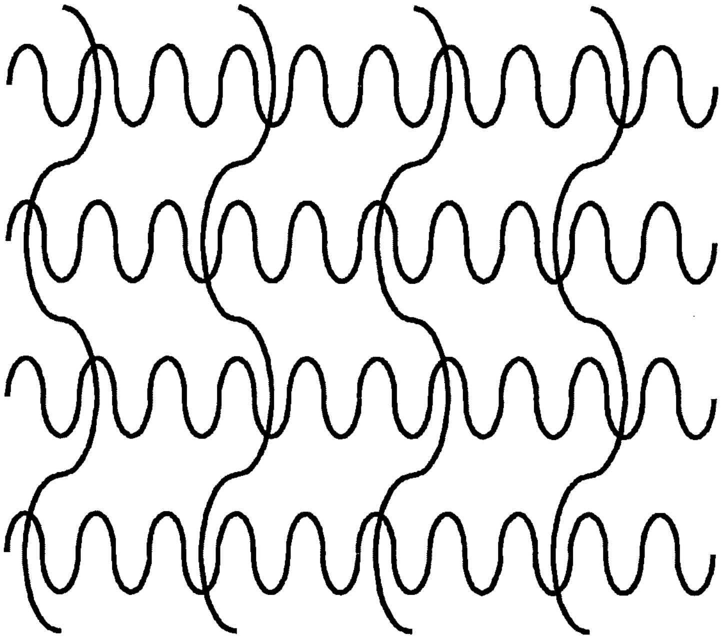

FIG. 9 shows an embodiment of the invention in which ellipses are arranged in a regular grid. Crossing points between filaments are arranged at regular intervals, in a repeating pattern, which is advantageous for easy manufacturing.

Figure 10:
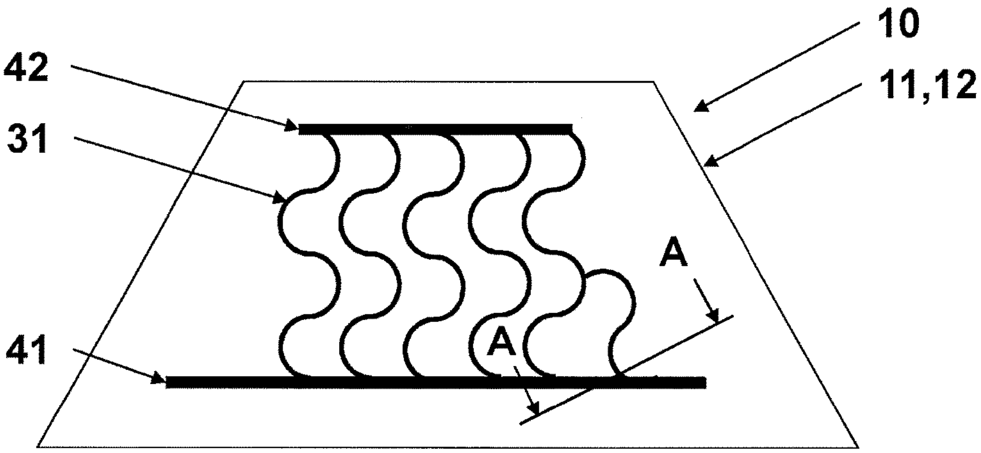
FIG. 10 shows a windshield according to the invention
Figure 11:
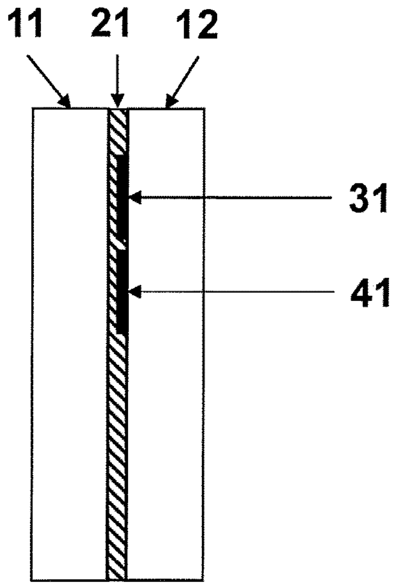
FIG. 11 shows a cross-section of the windshield of FIG. 10

FIG. 10 shows a plan view of a windshield 10, comprising first and second transparent substrates 11, 12. At least one ply of interlayer material 21 is arranged between the two sheets of transparent substrate 11, 12. First and second busbars 41, 42 are arranged on the ply of interlayer material 21. Heating filaments 31 are arranged between the first and second busbars 41, 42. FIG. 11 shows a cross-section corresponding to FIG. 10 on line A-A.

Examples of the Invention

A heater designer may select an ellipse axial ratio suited to a driver's direct ahead view and then repeat this same ellipse axial ratio all over the screen, in the knowledge it will also be approximately correct for the forward view from a passenger seat. The heater designer may also try to simplify the heater design by computing ellipse shapes needed for a single wire passing from the top to bottom of the screen directly in front of the driver and then repeat the choices of ellipses in every wire between the left and right sides of the vehicle. Though not optimum for the driver's vision, this will be a good compromise for the drivers view, the front seat passenger's view and any rear seat passenger's view. Also for manufacturing simplicity, the optically optimum axial ratios may not always be used.

A heater designer may select an ellipse axial ratio suited to when the driver focuses on distant objects. At the other extreme of the diffraction effects, when the driver focuses on the wires, the driver will see many 'sparkling points' over the windscreen concentrated around highway and vehicle lighting that is causing starburst effect to the driver's eyes. Human distraction can be high when the brain notices these 'sparkling points' because it is well known that it attempts to associate and group isolated points of light into constellations that allow it to classify the points as belonging to a recognisable familiar object. It is also well known that the brain watches very closely to see how points within constellations move relative to each other so that it can identify how that represented object may be moving in space. A perfectly regular pattern of wires has the risk of creating perfectly regular patterns of 'sparkling points' extending over large areas of the screen. More randomised forms of wire will tend to randomise the positions of individual 'sparking points' and reduce the probability that the brain starts to imagine them representing familiar objects. Randomness implies a total lack of order but for the purposes of this invention it is possible to define which aspects of regular order can be relaxed and limits to the relaxation of order in three ways, as follows.

1) In the case of a wire formed into a series of semi-ellipses, it is not necessary for the ellipses to be any particular scale, only specific shapes defined by axial ratios. The complete wire can therefore be formed from a sequence of semi-ellipses of differing scale to create a randomisation of 'sparkling points'. In practice there are preferred limits to this randomness because machinery will have a minimum bend radius capability and the use of too large an ellipse scale may cause adjacent wires in a heated screen to cross and overlap. Crossings and overlapping can cause undesirable appearances when wires are viewed in daylight.

2) A wire has an axis and modulations away from that axis, and semi-ellipses have an undesirable property that the wire always crosses that axis in a perpendicular direction. There are viewing situations where there will be a sequence of sparkles observed in perfect alignment on the wire axis. It has been found that by using a randomised selection of quarters of an ellipse that the diffraction advantages conferred by the semi-ellipses still occurs and there is a reduction in this alignment effect. Practical limitations to randomness are caused by minimum bending radii and the spacing of adjacent heater wires, because it is optically preferable that adjacent wires do not intersect and cross. The largest sizes of quarter-ellipse can be accommodated only when the randomised quarter-ellipses are chosen with an understanding of the shapes and positions of the quarter-ellipses on the adjacent wires.

3) If heater wires are not uniformly spaced in all areas of the screen it can be advantageous to adapt the maximum scale of the semi- or quarter-ellipses.

Further examples of the invention are of greatest utility in glazings using electrically conducting heater lines typically diameter/width of 50 um and below, for example formed by metal etching or metal deposition, printing or plating on a supporting substrate. It can be desirable when using these delicate wires occasionally to break the optical preference against wires touching and crossing to improve the ability and reliability of the wires to generate heat. Wire branching is another possibility that can be useful, particularly when the technique of creating wires allows arbitrary wire branching without significant extra manufacturing processes. It has already been described that semi-ellipse and quarter-ellipse shapes generate less optical distraction than other shapes and so these examples concentrate on the use of these shapes in wire intersections and branches. There is a closely related category where wires cross that differs from wire intersections only by there being no electrical connection at the crossing location.

Reasons to use branches, intersections and crossings on the wires include:

1) The wires may contain manufacturing defects that break their electrical conductivity. Some intersections can be used to divert heating current around damaged wire filaments.

2) Many heater areas are roughly rectangular and every wire is connected to both busbars (at opposite sides of the heater assembly), but some areas to be heated are not rectangular and constraining every wire to contact both busbars can result in unacceptably high or low densities of wires. In this scenario wire branching can be used. Branching may be used with wires where cross sectional areas are also carefully chosen for the different branches to optimise the uniformity of heating from the wires.

3a) If obstructions to implementing a uniform heating pattern occur in a more central part of the screen, e.g. around a rain sensor or a camera.

3b) Design restrictions may force a busbar to be partitioned around some obstruction into two busbars maintained at near equal electrical potentials by the external electrical power supplies. Wires then have to be adjusted in position and perhaps cross sectional area around this obstruction. Branches and intersections can both be useful techniques. The techniques used are likely to vary with the heating power required around the obstacle. If the busbar is divided then careful control of the voltages on the divided parts will be required if wires branch or intersect in such a way that unexpected heating could occur due to current flow in wires between separated lengths of the partitioned busbar.

4) A windscreen may be divided into different independent heater regions. These heater regions may overlap. They may also involve wires with axes oriented in different directions. For example a windscreen may have a windscreen wiper rest area heater, comprising horizontally aligned wires, that physically overlaps but is electrically separate from a driver vision area heater, comprising wires oriented between the top and bottom of the screen. In these cases heater wires are highly likely to cross.

Sections of ellipse perimeter can be used in the following ways:

1) Crossovers and interconnections can be formed by selecting sizes of semi-ellipse or quarter-ellipse that cause neighbouring wires to cross with an adjacent filament twice, as shown in FIG. 7. An aim in selecting the sizes of the semi-ellipses is that the crossover intersections are substantially perpendicular to each other. This is advantageous because two wires in close proximity and almost parallel can look like a defect when wires are viewed in daylight.

2) Crossovers and interconnections can be formed by selecting sizes of semi-ellipse or quarter-ellipse that cause neighbouring wires to cross such that a filament extends from one axis to another axis via a single crossing point, as shown in FIG. 8. An axis is a straight line joining a filament end at a first busbar with a nearest filament end at a second busbar.

3) Branches can be created with sections of ellipse perimeter where the branch is in a T-shape, as shown in FIG. 6. A branch filament substantially perpendicular to a parent filament is advantageous for avoiding close spaced parallel lines, as explained above in relation to FIG. 7.

The invention claimed is:

1. A glazing, comprising:

a transparent substrate a plurality of electrically conductive filaments, extending over the transparent substrate wherein the filaments are shaped into a sequence of portions of the perimeters of ellipses wherein in that:

ellipse axial ratios of the ellipses are in the range 1.1 to 4.0 and ellipse axial ratios of the ellipses are selected so that, from a pre-defined viewing position and in corresponding pre-defined viewing directions, the ellipses in the plane of the substrate are observed as circles.

2. A glazing according to claim 1, wherein portions of the perimeters of ellipses either side of a touching point on a central axis of an electrically conductive filament have different ellipse axial ratios and different major axis angles subtended to the central axis, the major axis angles being selected so that, from a pre-defined viewing position and in corresponding pre-defined viewing directions, the ellipses in the plane of the substrate are observed as circles.

3. A glazing according to claim 1 wherein a plurality of heater filaments comprises branches in non-rectangular areas.

4. A glazing according to claim 1 wherein a plurality of heater filaments have a variable spacing in non-rectangular areas.

5. A glazing according to claim 1 further comprising multiple laminated transparent materials.

6. A glazing according to claim 1 wherein filaments may be formed from wires, metal deposition or metal etching techniques.

7. A glazing according to claim 1 wherein the substrate is an automotive window.

8. A glazing according to claim 7 wherein the glazing suitable for installation at a rake angle and consequently driver vision is not normal to any significant area of the windscreen surface.

9. A glazing according to claim 7 wherein all the filaments use a single choice of ellipse axial ratio that is optimised for the direct forward vision of the driver.

10. A glazing according to claim 7 wherein all the filaments are formed from a continuous sequence of ellipse perimeters where the axial ratio of those ellipses varies with height up the windscreen and an axis of the ellipse is always in the vertical direction between top and bottom of the windscreen, the ellipse shapes being chosen for the single vertical cross-section of the windscreen directly forward of the driver.

11. A glazing according to claim 7 wherein filaments are formed from a continuous sequence of ellipse perimeters that are chosen to be optimal for the driver's vision in at least a pre-determined A-zone.

12. A glazing according to claim 7 wherein filaments use a randomised selection of sizes of ellipse in order that the filaments cross the central axis of the wire path at a randomised selection of angles, the random sizes of ellipse being selected between a minimum bend radius suitable for a filament forming apparatus and sizes that do not cause adjacent wires to touch and cross.

13. A glazing according to claim 11 where the maximum sizes of ellipse perimeters are restricted so that adjacent wires never cross.

14. A glazing according to claim 11 wherein ellipse sizes at any crossing points are selected so that the filament crossings are substantially perpendicular.

15. A glazing according to claim 11 wherein three filaments at a branch node are spaced at least 30 degrees from each other.

16. A glazing according to claim 1 wherein ellipses, used to generate the wire shape, are all approximately constant sizes and approximately half the perimeter of any ellipse defines the wire shape, thereby simplifying the wire forming process.

17. A glazing according to claim 11 wherein the filaments are optimised not only in the driver's A-zone but in the corresponding windscreen area that a front seat passenger will view, thereby providing one windscreen type for both left and right hand drive vehicles.

18. A glazing according to claim 11 wherein the ellipses are generally larger in size in any areas of the heater where wires are spaced further apart.

* * * * *